United States Patent [19]

Michel et al.

[11] 4,126,010
[45] Nov. 21, 1978

[54] OSCILLATING INSTALLATION FOR INSTALLING IN A BODY OF WATER AND METHOD FOR ITS CONSTRUCTION

[75] Inventors: Dominique Michel, Paris; Francisco de Assis M. Serrano, Issy-les-Moulineaux, both of France

[73] Assignee: Compagnie Generale pour les Developpements Operationnels des Richesses Sous-Marines "C.G. Doris", Paris, France

[21] Appl. No.: 817,373

[22] Filed: Jul. 20, 1977

[30] Foreign Application Priority Data

Jul. 23, 1976 [FR] France ............................ 76 22515
Mar. 21, 1977 [FR] France ............................ 77 08380

[51] Int. Cl.² ............................................... E02D 21/00
[52] U.S. Cl. ........................................ 405/202; 175/9
[58] Field of Search ........................... 175/5–10; 61/86, 88–91, 94, 97, 100, 101

[56] References Cited

U.S. PATENT DOCUMENTS

| 2,430,014 | 11/1947 | Hansen | 61/90 |
| 3,667,240 | 6/1972 | Vilain | 175/9 X |
| 3,670,515 | 6/1972 | Lloyd | 175/9 X |
| 3,677,016 | 7/1972 | Garrigus | 175/9 X |
| 3,693,362 | 9/1972 | Leonard et al. | 61/63 X |

Primary Examiner—Dennis L. Taylor
Attorney, Agent, or Firm—Laurence R. Brown

[57] ABSTRACT

The invention relates to an oscillating installation installed at a fixed site in a body of water, comprising a shaft which rests on a heavy base, which itself bears on a bed, and which supports a platform at its upper part, the shaft is connected to the base by a ball-joint consisting of two hemispherical caps. The shaft is loaded in such manner that the joint is always under compression. Examples of forms of joint comprising packings between the two caps are described. The invention also relates to a method of laying such an installation, the latter being conveyed by flotation to the site, and the correction of listing by the use of caissons disposed along the shaft.

26 Claims, 41 Drawing Figures

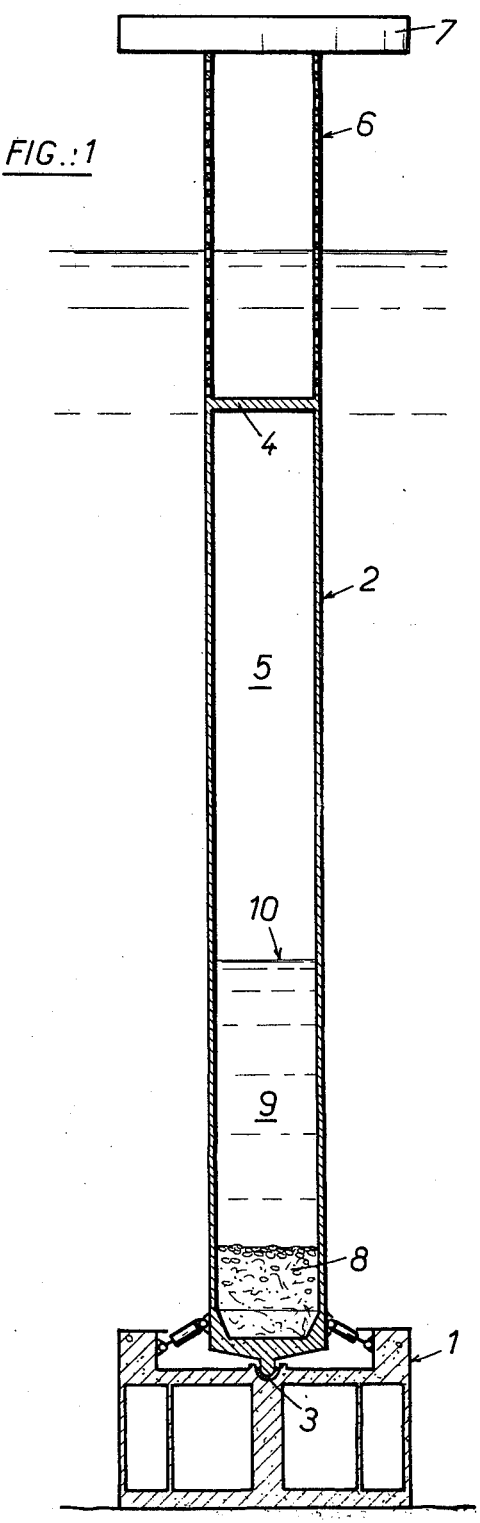

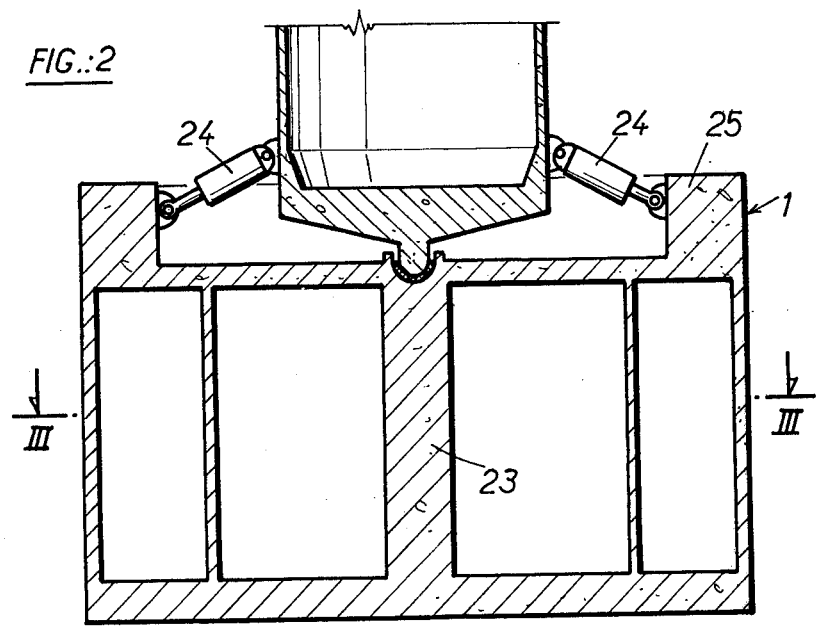
FIG.:2
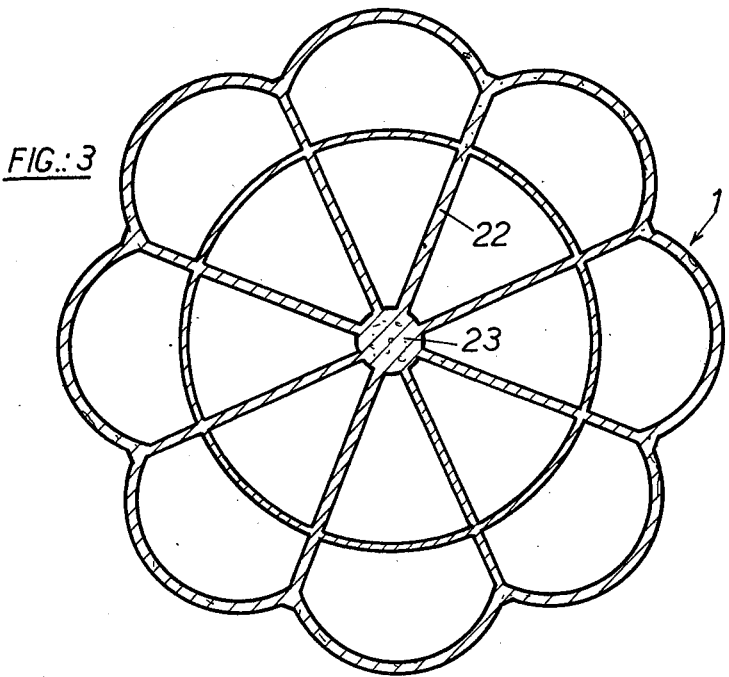
FIG.:3

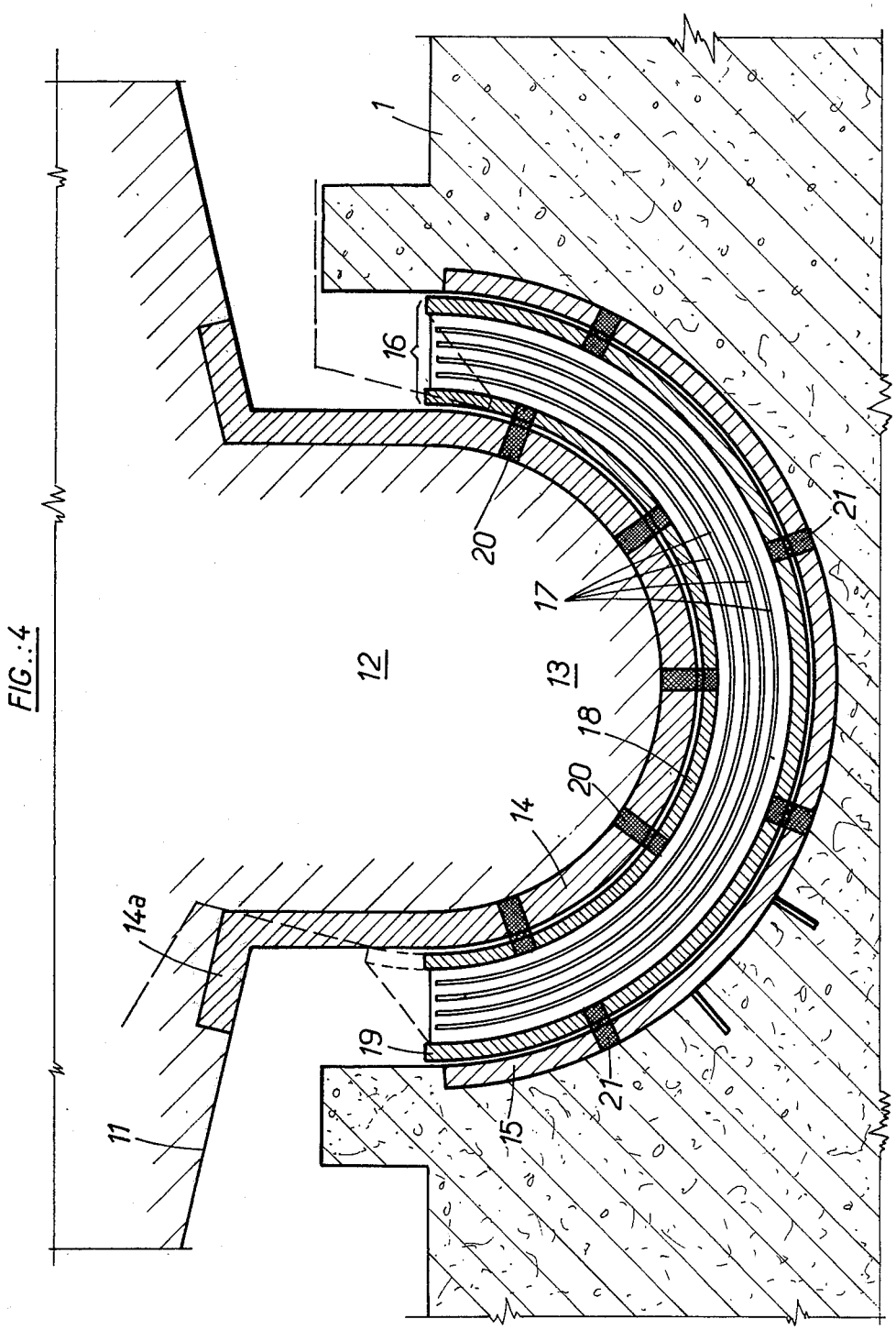

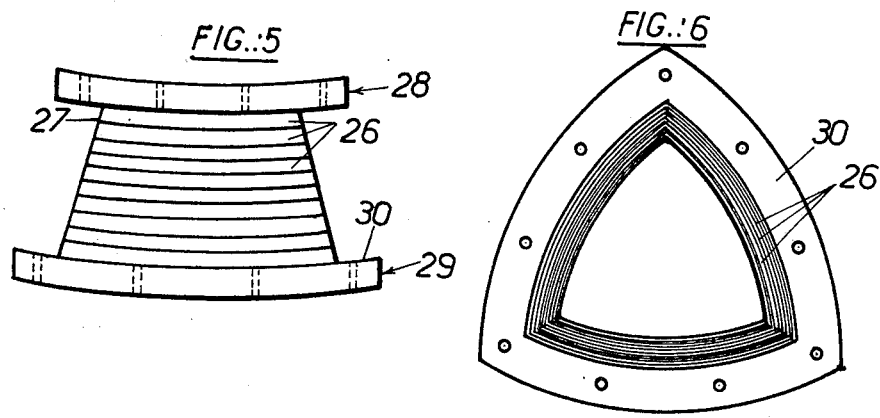
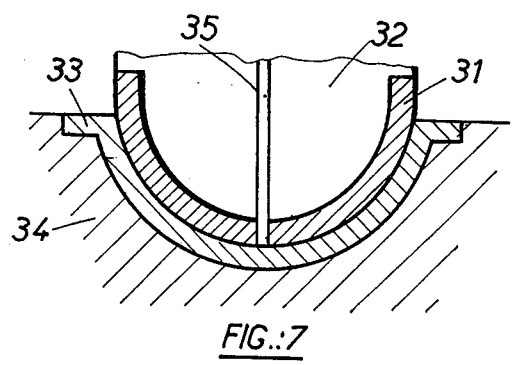
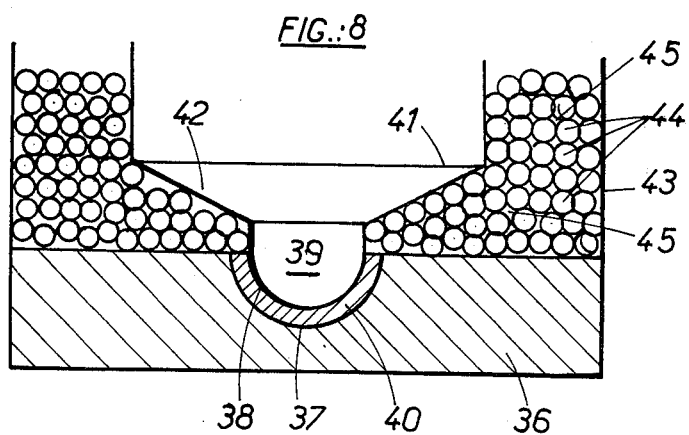

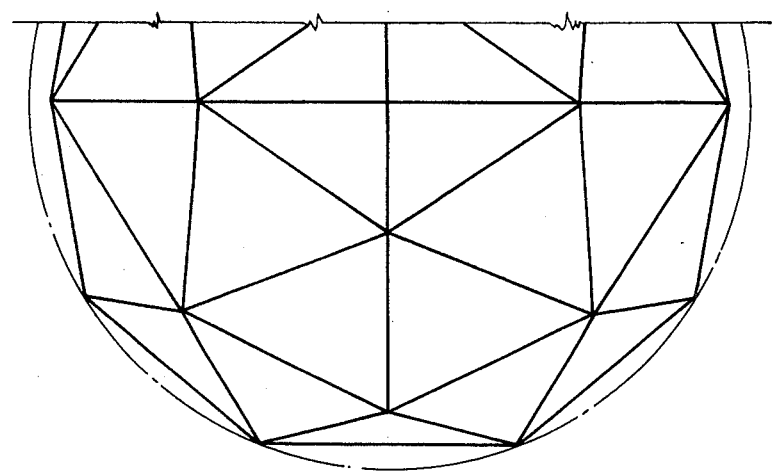
FIG.: 9
FIG.: 10
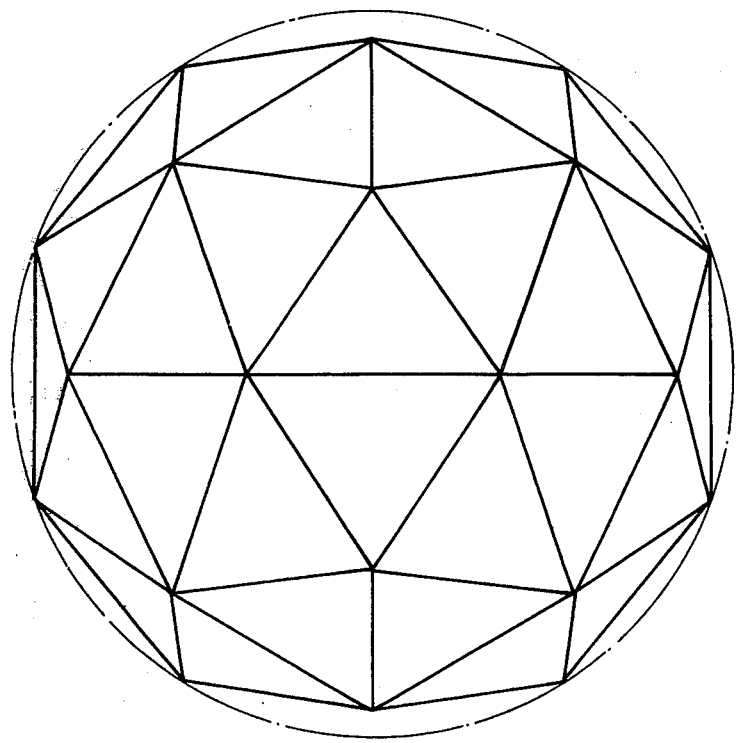

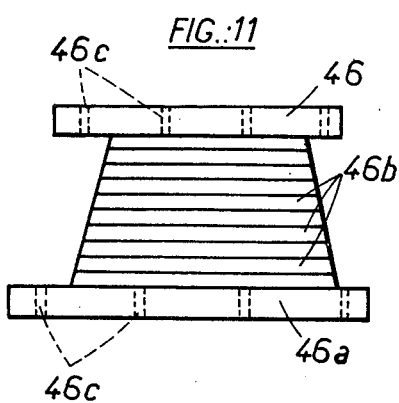
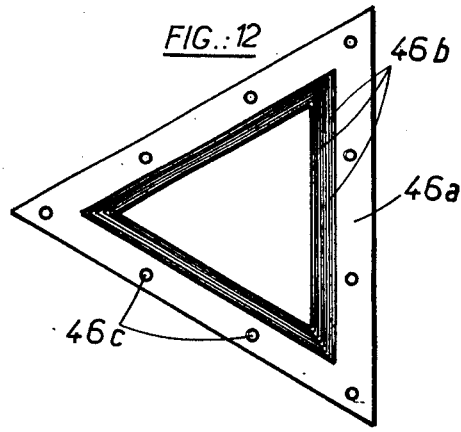

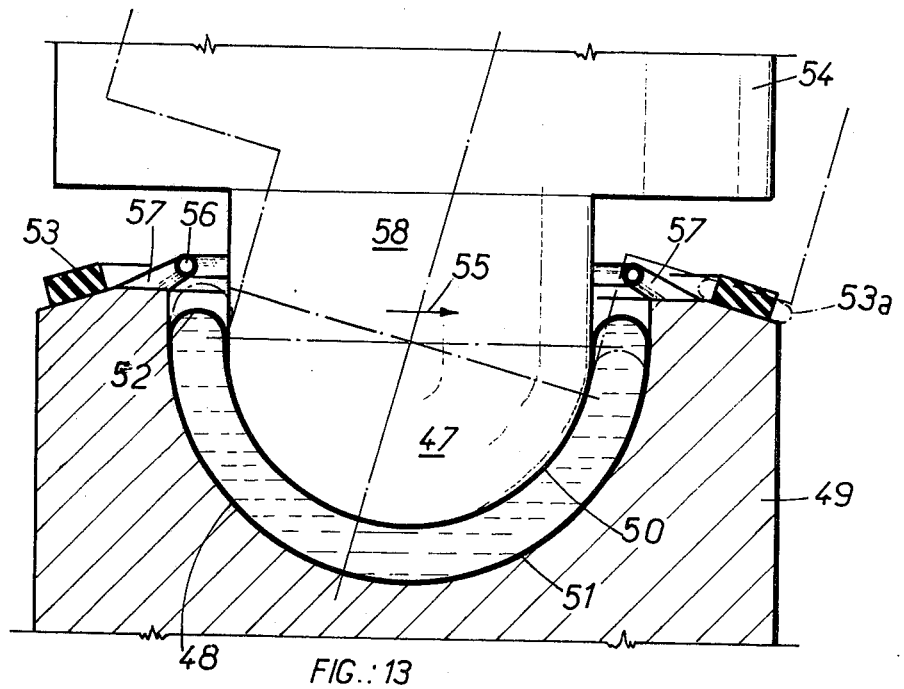
FIG.: 13
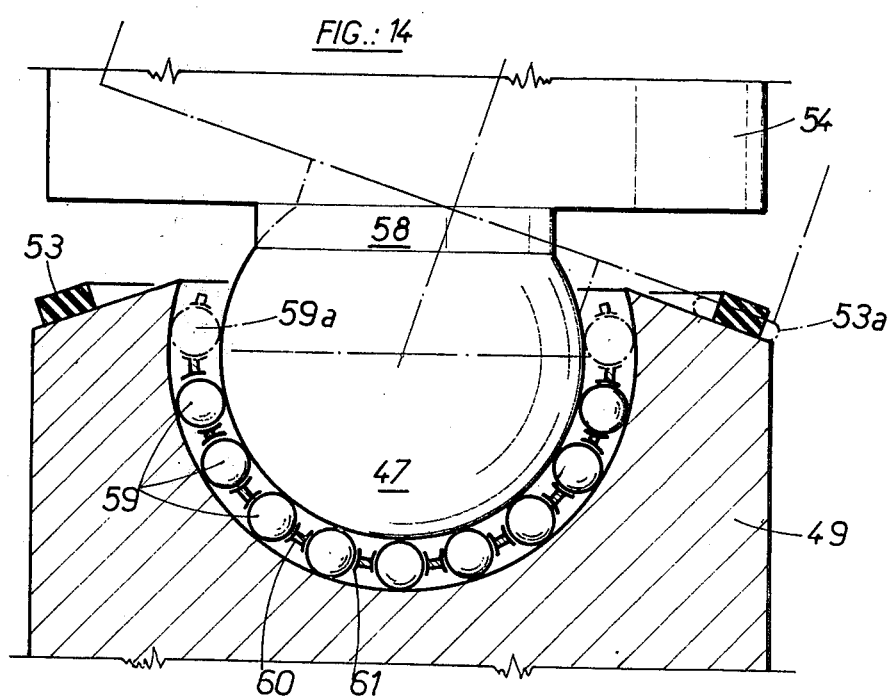
FIG.: 14

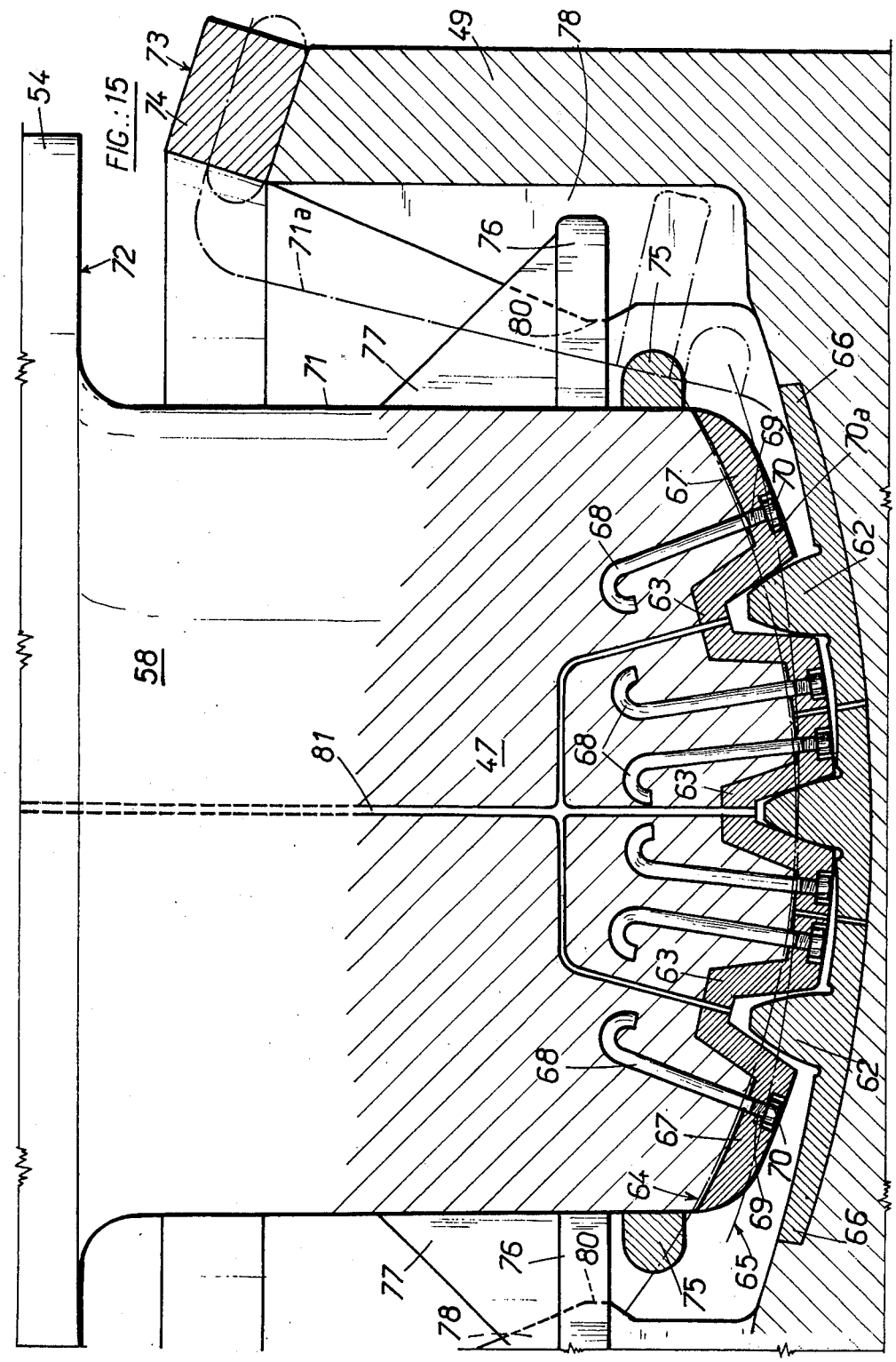

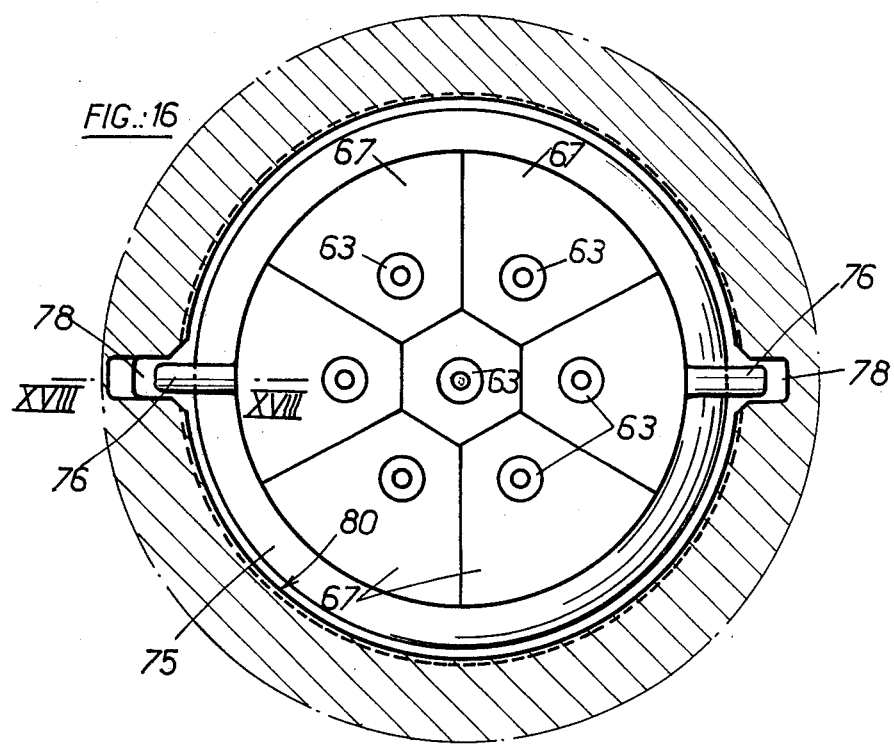
FIG.:16
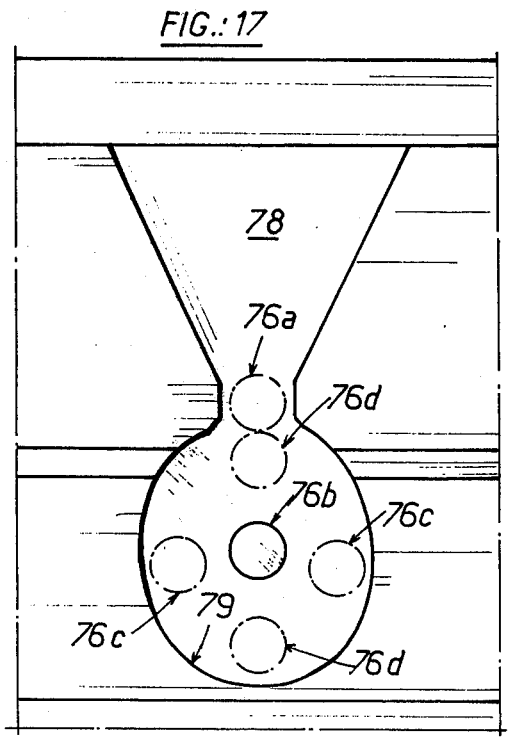
FIG.:17
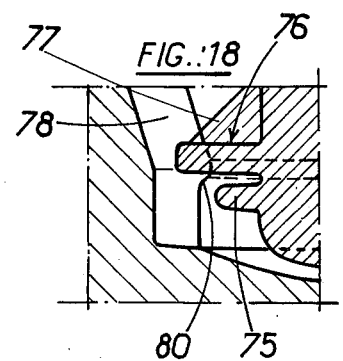
FIG.:18

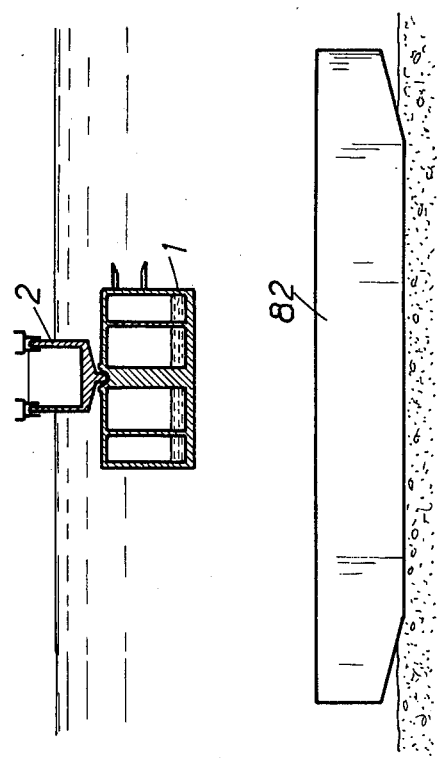
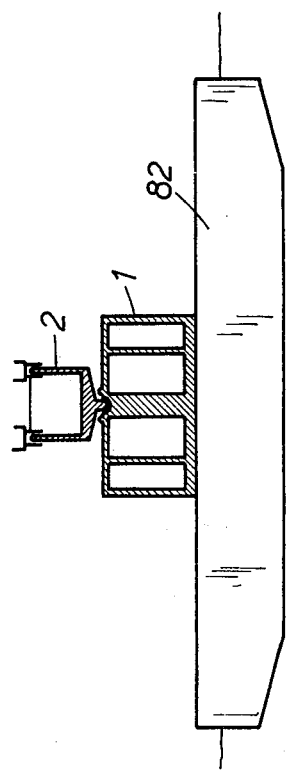

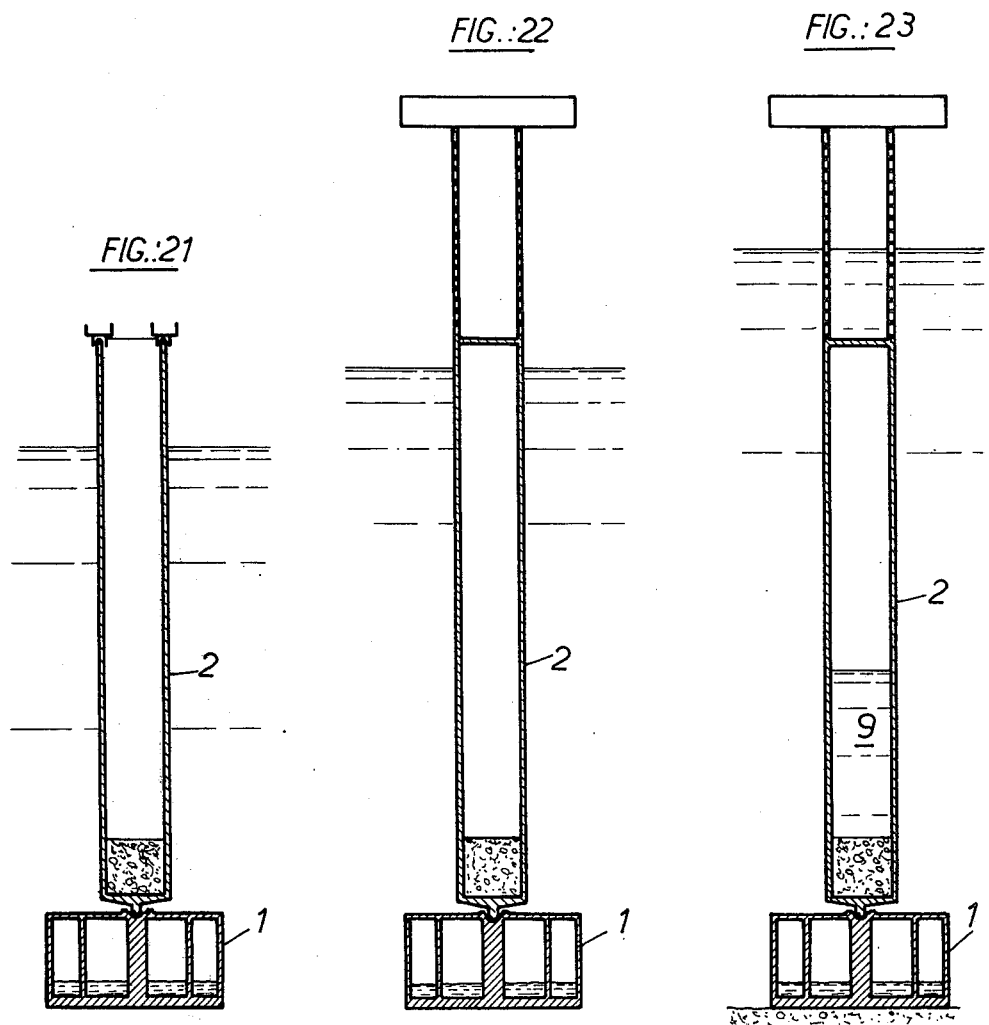

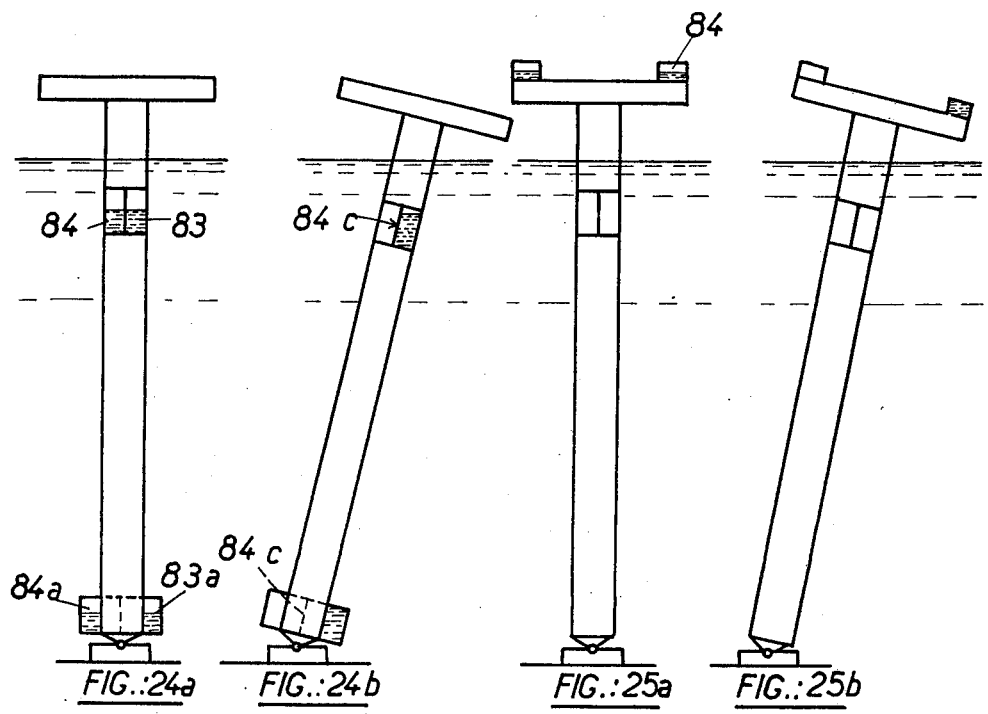
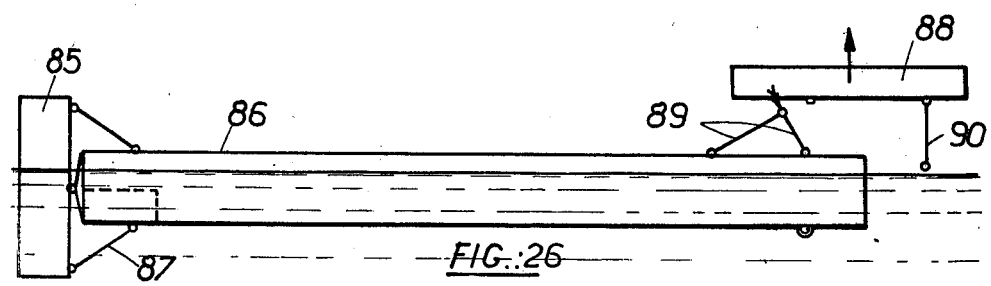
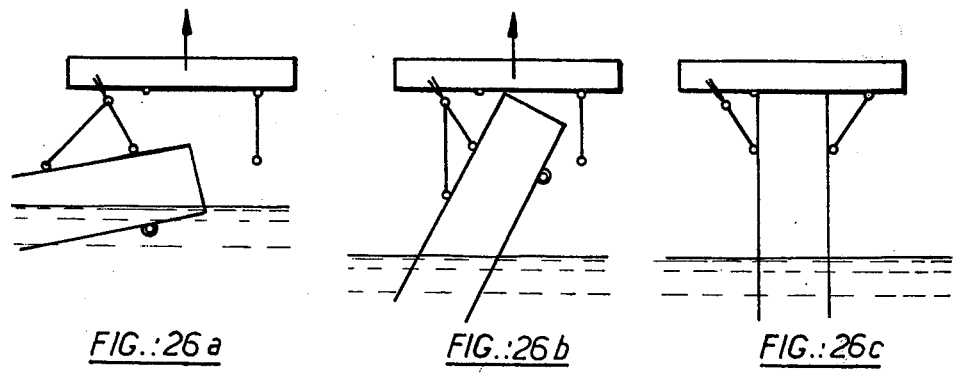

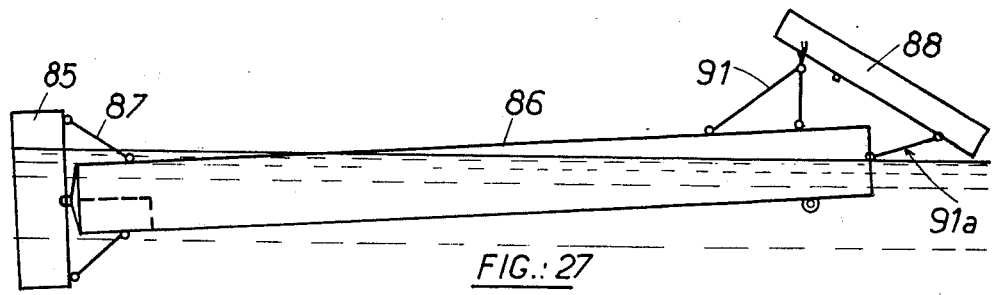
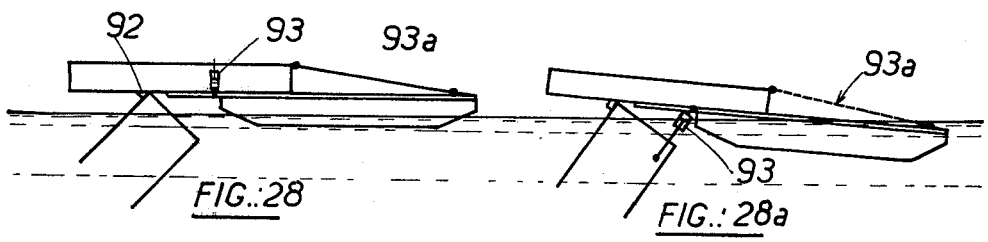
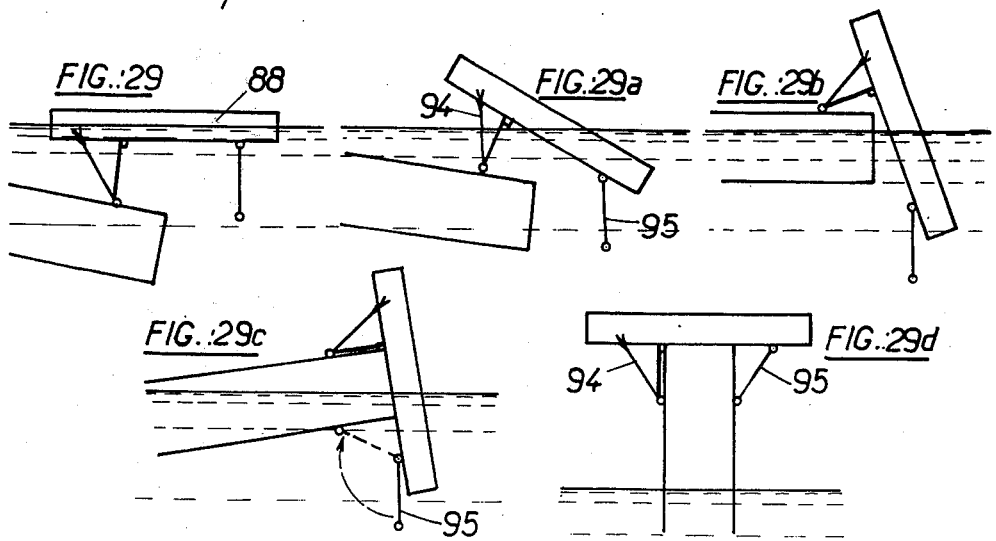

OSCILLATING INSTALLATION FOR INSTALLING IN A BODY OF WATER AND METHOD FOR ITS CONSTRUCTION

The present invention relates to an installation such as a platform intended to be installed at a fixed site, in the sea or in a body of water, and suitable for different uses, such as storage of materials, drilling operations, etc. and a method of laying same.

This installation comprises a shaft which rests on a heavy base, which itself rests on the bottom, and which supports on its upper part the platform itself, the shaft being of a height such that the platform is always above the level of the water.

The shaft is connected to the base by a ball joint allowing it to oscillate in all directions under the action of swell and it comprises an impervious part forming a float so located that its centre of hydrostatic pressure is always above the centre of gravity of the assembly of shaft, platform and masses which it carries, in order to ensure the return of the shaft to its vertical position.

According to one feature of the invention, the joint consists of two hemi-spherical surfaces and the shaft is charged near to its base with a ballast such that the total weight of the assembly of ballast, shaft, platform or other part of the installation and masses which it carries, is greater than the maximum lifting force exerted on the shaft by the greatest swells and such that the ball joint, through which the shaft bears on the base, is thus submitted to permanent compression.

According to another feature, the invention relates to a method of laying an installation, characterised in that the base and the shaft assembled by the ball joint and the deck connected to the shaft by fixed and/or adjustable links are towed to the immersion site, in a substantially horizontal position, the base and the shaft, at least, floating, the base and the end of the shaft adjacent the base are ballasted to move progressively into the vertical position while the deck is located on the end of the shaft.

The following description with reference to the accompanying drawings, given by way of examples, will enable the method of carrying the invention into effect to be well understood.

FIG. 1 is a view in vertical section of an oscillating platform according to a first embodiment of the invention.

FIG. 2 shows on a larger scale and in vertical section the base and the lower part of the shaft.

FIG. 3 is a sectional view of the base on the line III—III of FIG. 2.

FIG. 4 is a vertical section on a larger scale of the ball joint between the shaft and the base.

FIG. 5 shows a side view of an embodiment of a damping device with spherical armatures.

FIG. 6 is a view from above of the damping device of FIG. 5.

FIG. 7 is a sectional view of a ball joint in metal with metal to metal contact.

FIG. 8 is a sectional view of a ball and socket joint having means for limiting the oscillations of the shaft.

FIGS. 9 to 12 show a first variant of the joint in which the continuous geometric spheres are replaced by polyhedral surfaces.

FIGS. 13 and 14 show a second and a third variant comprising respectively an hydraulic cushion and a ball bearing.

FIGS. 15 to 18 show a fourth variant in which the shaft and the base are held by cogs.

FIGS. 19 to 23 show diagrammatically the successive stages of the construction of the platform.

FIGS. 24a and 24b are diagrams showing the use of caissons to control listing.

FIGS. 25a and 25b show another arrangement of the caissons for regulating listing.

FIGS. 26, 26a, 26b, 26c illustrate a method of laying an installation.

FIG. 27 illustrates a first variant of said method.

FIGS. 28, 28a, 28b, 28c illustrate a second variant of said method.

FIG. 29, 29a, 29b, 29c, 29d illustrate a third variant of said method.

In the embodiment shown in FIG. 1, a heavy base 1, preferably hollow and filled with water, rests on the bed of the sea. A shaft 2, of cylindrical form, bears on this base by a ball joint 3 which will be described in detail hereinafter. The shaft has an impervious chamber 5 between the ball joint and a transverse wall 4. It is extended above the wall 4 by a well perforated cylinder 6, in such manner as to allow sea water to circulate freely therethrough to reduce the effort of swell. The cylindrical part 6 supports a platform 7. It is sufficiently high for the platform to remain above the largest swells.

The lower part of the chamber 5 of the shaft is filled with a relatively dense ballast 8 having for example a density of the order of 5 at least, in order to occupy a relatively small volume. This ballast, which could consist of iron ore, for example, is covered by a quantity of water as far as the level 10 and the rest of the closed chamber 5, filled with air, acts as a float.

The weight of the ballast 8 added to those of the water 9, the shaft 2 and the platform 7 is such that it is always greater, even in the strongest swells, than the lifting force developed by the float 5, so that the ball joint 3 is always compressed. The ballast 8 ensures furthermore that the centre of gravity of the assembly remains below the centre of hynostatic pressure, in a manner to create a force returning the shaft to the vertical in the case of its inclination about the ball joint.

The detail of the joint is shown in FIG. 4. The lower transverse wall 11 of the shaft, of conical form, has a projecting head 12 of which the diameter could be for example of the order of a meter, this head terminating in a spherical cap 13. It is covered by a steel cap 14 of the same shape, imbedded in the concrete of the shaft by a rim 14a. The upper wall of the base 1 is itself hollowed out in the form of a spherical cap, the wall of the hollow being covered by a concave spherical cap 15, of steel, concentric with the cap 14. In the space between the two caps, the distance between which could be several dozen centimeters, is located a deformable cushion 16 which is made up of a pile of plates of elastomer, such as neoprene, bound by intercalated thin metal sheets 17 and by an armature 18-19 of thick metal sheet on each face. The armatures 18-19 take the form of spherical caps concentric with the caps 14 and 15. They are fixed respectively to the latter by an assembly of bolts 20-21. This cushion is made in separate plates by vulcanisation under pressure and the plates are then assembled and stuck together between the two hemi-spherical shells 18-19.

The consolidation of the different layers can be effected by gluing by means of an epoxy resin and gluing of this kind could be provided between the hemispherical shells 18-19 and the caps 14 and 15.

Due to the effect of a rotation imposed on the shaft 2 by the swell, the neoprene layer is distorted in accordance with the relative movement of the two shells 18-19 connected respectively to the shaft and the base, this distortion developing furthermore an elastic force which is added to the action of the float 5 for returning the shaft to the vertical.

The base can be formed, as shown in FIGS. 2 and 3, by a hollow body of generally cylindrical but lobed form and having an assembly of radial partitions 22 for offering maximum resistance, these partitions extending from a central column 23 at the top of which the ball-joint is located. These partitions form an assembly of compartments which could be filled with water or another liquid augmenting the weight of the base.

In order to limit the oscillations of the shaft and even obtain a supplement to the return force, jacks 24 could be provided at the base of the shaft, for example 8 or 10 jacks, distributed around the shaft and bearing, on the one hand, on the latter and, on the other hand, on a flange 25 provided at the top of the base.

According to another embodiment, FIG. 5 shows a damping device or "silent block" formed on a pile of plates 26 of elastomer, such as neoprene, separated by thin metal plates 27. This pile is completed on its two faces by an armature 28, 29 of thick metal sheet. The assembly is vulcanised under pressure. According to one embodiment, the armatures 28 and 29 as well as the thin metal sheets take the form of spherical elements of polygonical shape. FIG. 6 shows the view from above, the upper armature having been removed, of a damping device having a triangular form. The armatures 28 and 29 have different radii of curvature so as to match as well as possible the spherical members of the joint on which they are to be fixed, said members being arranged to be separated, in use, by the thickness of the damping devices. The latter are attached to the spherical members forming the joint by their edges 30 which are formed with a certain number of holes in which threaded bolts are located. The shape of such damping devices is not limited to that of a triangle and a shape having a greater number of sides is equally possible. The damping devices could equally be of sphero-conical or sphero-cylindrical shape, which leads to consideration of a polygonical shape with an infinite number of sides.

FIG. 7 is a diagrammatic sectional view of a ball joint or ball and socket joint of which convex spherical part 31 is, for example, mounted at the end of the shaft 32 and the corresponding concave spherical part 33 is fixed in the concrete base 34. According to this embodiment of the joint, the contact members 31 and 33 are of cast metal. The casting of members of appreciable size (several meters in diameter) results in surface defects which generally necessitates machining the members before they can be used. Since the casting and the machining are not usually carried out in the same factory, it is necessary to transport the members to the machine shop resulting in an increase in their cost and delays. In order to reduce these disadvantages, one can carry out the grinding-in of the members at the construction or immersion site of the shaft and base. According to the method of making the ball joint, the contact elements forming the joint, fixed to the end of the shaft and on the surface of the base, are coupled together. The shaft and the base are then at least partially submerged and are subjected one against the other to forced oscillatory and/or rotary movements. This grinding-in can be carried out with or without abrasive products injected between the contacting surfaces via a pipe 35 located, for example, in the shaft and passing through the head 32 supporting the spherical cap 31. The grinding-in could equally be effected by the natural oscillations when the base and shaft are in place on the site. The pipe 35, serving as a means of injection, enables the repeated and alternate injection of a fluid loaded with an abrasive material followed by a washing fluid, for example water, in order to drive out the detached metallic particles from the grinding-in with the abrasive particles already used.

When the contact surfaces are sufficiently ground-in and the installation is in place, it is still useful to reduce wear as far as possible and avoid a seizure of the joint. To do this, a lubricant is inserted between the surfaces in contact, for example, grease, oil, graphite, clay, barytes, etc of a mixture of two or more thereof.

The lubricant is injected under pressure by means of the pipe 35 previously used for introducing the abrasions and for cleaning the surfaces.

FIG. 8 shows in diagrammatic section a device for limiting the maximum oscillations of the shaft. The base 36, provided with the concave part 37 of the joint, supports the other convex part 38 fixed in the concrete 39 of the shaft. The space 40 between these two parts corresponds to various cushions, damping devices or steel caps described or to be described. According to a particular form shown at the base of the shaft, the latter has a truncated part 42 between its cylindrical end 41 and the head 39. The end of the shaft is surrounded by a concentric wall 43 integral with the base 36. The volume defined by a part of the shaft, its truncated end and the wall, is filled with bodies of revolution 44, the interstitial spaces 45 being occupied by a viscous fluid. According to one embodiment the bodies of revolution are balls of elastomer soaked in oil. According to another embodiment, the lower circular part of the shaft carrying the head will enable, with the balls of elastomer, a limitation of the maximum oscillations to be obtained.

In the variant embodiment shown in FIGS. 9 to 12, the continuous spherical surfaces of the base of the shaft and of the base have been replaced by polyhedral surfaces easier to make in large sizes.

FIG. 9 shows in elevation the shape of the end portion of the head of the shaft and FIG. 10 shows it in horizontal projection. It can be seen that the surface is formed of a series of juxtaposed equilateral triangles inscribed in the spherical surface that this assembly of triangles replaces.

The "silent blocks" associated with the two polyhedral surfaces of the shaft and of the base are shown in FIGS. 11 and 12. Each of them consists of two triangular plates 46, 46a (in FIG. 12 the plate 46 is assumed to have been removed) the surfaces of which are equal respectively to those of a triangle of the shaft and of a triangle of the base. These two plates are connected together by a pile of neoprene plates 46b separated by metal reinforcing sheets, the assembly being glued together by hot vulcanisation.

The plates 46, 46a are provided at their periphery with holes 46c for fixing them to the shaft and to the base, for example by means of rods embedded in the concrete and provided with a threaded end on which a nut can be screwed as described above. In addition to ease of manufacture and assembly, this arrangement of "silent blocks" allow water to be circulated through them and avoids heating due to hysteresis of the elastomer.

Finally, the stiffness of the bearing thus created is less than that of a bearing in a single piece, which can be important when movements of the shaft and platform of large amplitude are permitted.

In the variant shown in FIG. 13, the convex spherical cap 47 situated at the base of the shaft is separated from the concave spherical cap 48 of the base 49 by an hydraulic cushion.

This cushion consists of two hemispheres 50 and 51 of elastomer, connected by an annulus 52 in such manner as to form an impervious space which is filled with a liquid or gas by means of a valve not shown. This filling is carried out after the cushion has been laid in the concave cap of the base, the shaft being not yet in place. The volume of liquid injected is equal to that which the cushion has when it is functioning in the form shown in FIG. 13. Then, the air filling the rest of the inside of the cushion is removed by pumping and the cushion assumes the shape similar to that of a deflated balloon. It acquires its definitive form when the shaft is placed in position when the head 58 bears upon it. This bearing can generate in the liquid a pressure of the order of several dozen bars. For example, for a platform having an apparent maximum weight of about 4000 tons and a head of 4 meters diameter, the pressure in the liquid could be 30 bars.

In such an embodiment, it is beneficial to provide a device for defining the maximum oscillations of the shaft. Such a device may comprise on the base a ring 53 of reinforced elastomer acting as an abutment for the base of the shaft 54 and defining the maximum oscillation thereof (position shown by broken lines 53a) and forming a damping device at the same time.

In order to take up the sharp force exerted on the shaft by the pressure of the swell and represented by the arrow 55, another abutment device may be provided consisting for example of a ring 56 fixed on the base by means of radial brackets 57 and against which the head 58 bears in the case of lateral off-setting by the pressure of the swell, the hydraulic cushion in effect offering only slight resistance to this off-setting. This embodiment has the advantage that there is no mechanical connection between the head 58 and the hydraulic cushion, which facilitates removal and replacement of the platform.

FIG. 14 shows another embodiment in which a ball bearing is placed between the head 47 and the spherical cap of the base.

The separation of the balls 59 distributed over the whole surface of the spherical caps is maintained by a spherical cage 60 comprising openings 61 in which the balls are inserted with a slight play. When the shaft inclines towards the right, for example, the cage turns with the balls and the end ball assumes the position 59a shown in broken lines.

It should be pointed out that the balls take up the considerable force due to the pressure of the swell, to such an extent that it is not necessary to provide means for this purpose.

For weak or average vertical loads, the balls could be of elastomer, which would reduce the precision required in the manufacture of the head and cap.

The embodiment shown in FIGS. 15 to 18 is also an embodiment of rolling but in this case the spherical parts of the head and base are provided with sets of teeth which are suitable for taking up the sharp horizontal forces created by the pressure of the swell and equally for preventing rotation or oscillations of the platform and of the shaft about the axis of the latter.

In the embodiment shown, the set of teeth comprises teeth 62 integral with the cap of the base and tracks 63 integral with the spherical cap of the head. These teeth of large dimensions are preferably of circular form and are distributed, as shown in FIG. 16, around the vertical axis of the head and shaft with a track situated in the centre of the head, so that the embodiment shown comprises a set of seven teeth, which number can naturally be varied. Six of these teeth are located at the apex of a hexagon.

The circle 64 shown in broken lines on FIG. 15 is the section in the plane of the figure of the original sphere of the tracks 63 while the circle 65 relates similarly to the original sphere of the teeth 62.

When the platform oscillates, the original sphere 64 rolls in the original sphere 65 and there are always one or more teeth engaged whatever the position of the platform when listing or at rest. The sharp force due to the pressure of the swell is thus always transmitted to the base whatever its direction.

The teeth and tracks are preferably made independently of cast steel for example.

Each tooth comprises a flange 66 and each track 63 similarly comprises a flange 67. These flanges provide for fixing in the concrete of the head 58 and of the base 49 for example by means of rods 68 which comprise a threaded end 69 on which can be screwed a nut 70 for engagement in a recess 70a of the flange. The flanges of the teeth are fixed in the same manner, the fixing means not being shown.

The lower surface of the flanges 67 and the upper surface of the flanges 66 form the spherical rolling surfaces. The convex sphere formed by the assembly of flanges 67 rolls on the concave sphere formed by the assembly of flanges 66.

The broken line 71a shows the extreme position of the periphery 71 of the head when the shaft is inclined and the underface 72 of the shaft is abutting the upper surface 73 of a damping ring 74 located on the base and formed by "silent blocks" of elastomer which can deform elastically. When it is crushed by the oscillation of the shaft, this ring applies to the periphery of the shaft a force which assists in returning the shaft to the vertical position and thus contributes to the stability of the installation.

It is necessary to note that the extreme position shown in FIG. 15 corresponds to an angle of oscillation of the shaft greater than that produced by the combined action of the greatest known swell and maximum wind, so that this angle will not be reached except in case of accident.

The installation is completed by a device for centralising and orienting the head of the cap of the base, which allows the laying and removal of the platform.

Near to the spherical base of the head, but a little above it, is an annular projection which goes around the head and above which and at the two ends of a diameter is a positioning lug 76 reinforced by a gusset plate 77. Each of these positioning lugs engages a groove 78 in the form of a V formed in the base and which ensures the correct orientation of the platform before the engagement of the teeth 62 with the tracks 63.

FIG. 16 shows the part of the bearing integral with the shaft as seen from above. There is shown the location of the tracks 63 with their flanges 67 and the positioning lugs 76 as well as the grooves 78.

FIG. 17 shows the detail of the form of the V grooves 78 and the arrangement of the damping devices 74.

There is shown the position 76a of the positioning lug 76 at the time of placing in position, the position 76b of this same lug when the platform is vertical and the extreme positions 76c in the case of rolling and 76d in the case of pitching. The V groove 78 has an elliptical opening 79 at the bottom for the clearance of the positioning lug 76.

FIG. 18 is a section on the line X—X of FIG. 16 and shows the centering ring 75, the positioning lug 76 and the V groove 78. One also sees a pad 80 provided on the base for centering the ring 75 when the head 58 is introduced into the cap 49.

A greasing system is provided enabling a dense mixture to be injected under pressure and by remaining in the cap ensure the lubrication of the surfaces of the teeth. The injection of lubricant is effected by means of tubes 81 extending to the bridge of the platform via the shaft. This lubricant could consist for example of a mixture of drilling mud and graphite with a passivating agent.

As an example, the construction and laying of an installation of the type shown diagrammatically in FIG. 1 could be carried out as shown diagrammatically in FIGS. 19 to 23.

In FIG. 19, a barge 82 leads the base 1 and the lower part of the shaft 2 already constructed, to the place where the installation is to be placed, for example on the barge itself.

In FIG. 20, the barge is lowered to the bed of the sea and, by means of suitable piping, a quantity of water is introduced into the base sufficient to secure its immersion, in such manner that only a certain height of the shaft emerges. The construction of the latter is then continued, so that the immersion of the base increases in accordance with the increase in weight. (FIGS. 21 and 22). In the final stage, the introduction of water 9 to the lower part of the shaft causes the base to rest on the bottom.

The hollow base 1 can be used to store liquids other than water, for example hydrocarbons. In such case, it is necessary to provide for the passage of liquid through the joint. To this end, holes can be pierced in the hemispherical caps and shells and even in the neoprene around these holes, with a pierced diameter preferably a little greater than that of the holes.

The embodiments previously described require devices capable of limiting oscillations. An example has been described with reference to FIG. 8; other embodiments are shown in FIGS. 24a, 24b and 25a, 25b. The purpose of these devices is not only to limit oscillations but to provide means for correcting listing. These means consist of caissons 83 and 84, or 83a and 84a located at different points of the installation. Control of listing is effected in these two cases by transfer of water without variation of the total weight of the installation. In FIGS. 24a and 24b the caissons 83 and 84 are located in the shaft and occupy part of the cylindrical interior volume of the shaft. In these same Figures, the arrangement of caissons exterior to the shaft is shown at 83a and 84a. Their volume is divided in two vertically by a diametral partition 84c and an equal volume of water is allotted to the two caissons in the vertical position of the shaft as shown diagrammatically in FIG. 24a. By pumping water from one caisson to the other, one creates a couple the result of which is shown in FIG. 24b. It is clear that in order to be able to correct listing in any direction, at least a second assembly of caissons is provided in the shaft, the partition separating the two caissons being perpendicular to that of the first caissons. According to another embodiment, the cylindrical volume constituting the caissons is divided into four or more sections by radial partitions and consists of part of the internal volume of the shaft.

FIGS. 25a and 25b show an arrangement of caissons disposed on the deck. The method of using these caissons as well as their number and their distribution can easily be understood with reference to the explanation given with regard to FIGS. 24a and 24b.

The transfer of water is controller by a dynamic positioning device.

According to embodiments not shown:

The regulating caissons are provided with turbines piloted by a dynamic positioning device.

Propellers fixed on the shaft are piloted by a dynamic positioning device and allow correction of tilting due to any possible tilting moments: swell, wind, current, eccentric loadings, oscillations. These propellers could equally allow a rotation of the structure if need be.

These different means: caissons, turbines, propellers could be used separately or in combination.

FIG. 26 shows a method of constructing an installation such as previously described.

The base 85, assembled to the completed shaft by the ball joint and immobilised with respect to the shaft by a system of struts 87, as well as the deck 88, connected to the shaft by fixed and/or adjustable connecting means 89, are towed to the immersion site, in a substantially horizontal position, the base 85 and the shaft 86, at least, floating. According to the embodiment shown, the deck 88 is maintained substantially horizontal above the surface of the water by known means such as boats, cranes, barges, etc. When the assembly arrives at the site, the ballast tanks of the base and shaft are ballasted with water (FIG. 26a) to bring it progressively into the vertical position (FIGS. 26b and 26c). During the righting of the shaft, the deck is raised so to come in the final stage on to the end of the shaft. The connecting means 90, until then idle on the deck, are fixed to the shaft.

According to a variant shown in FIG. 27, the shaft has a slight set, the deck is horizontal or oblique and is held to the shaft by a system of levers and jacks 91 which are actuated so as to bring the deck into its final position when the shaft is vertical. The device 91a is a bar used only while towing.

The advantage of this method of laying consists principally in the fact that the shaft and its base in the horizontal position have a master-couple very much less than that of the same assembly in the vertical position. This reduction allows the power of the tugs to be reduced and the effect of wind and waves when towing to be minimised.

According to a variant of the mounting of the deck shown in FIGS. 28 to 28c, the deck is transported by barges to the immersion site. The deck is advanced hanging above the shaft, then, being always connected to the barge by a connecting bar 29a, it is fixed to an edge of the shaft by a hinge joint 92 (FIG. 28) whereupon the shaft is ballasted so that it is inclined and present only a small emerging height. The jacking devices 93 are installed between the deck and the shaft, then the barge is ballasted to free the deck, which enables the bar 93a to be disconnected (FIG. 28a). The shaft is then righted and deballasted, while the jack devices keep the deck substantially horizontal (FIG. 28b). Finally, the deck is fixed (FIG. 28c) and the jacks are removed.

The variant of mounting the deck shown in FIGS. 29 to 29d illustrate the case where the deck comprising an impervious shell is towed afloat. FIG. 29 shows the first stage consisting in ballasting the end of the shaft so that if finds itself below the deck and connected thereto by a rigid but mobile link 94, the ballasting water is progressively driven out and the shaft in righting itself causes the deck to swing (FIG. 29a), by way of the link 94, which assumes a substantially vertical position perpendicular to the axis of the shaft (FIG. 29b). The deck is then fixed to the shaft, which is in a substantially horizontal position, by its second link 95 (FIG. 29c). The shaft is then ballasted so as to take up the final vertical position (FIG. 29d).

Variants of the method of mounting the deck in which the deck rests substantially horizontal and near the surface during its fixing to the shaft, such as illustrated in FIGS. 28 to 28c, allow a reduced loading of the equipment without necessitating the substantial means normally required.

The loading of the deck can obviously be done by means and techniques already well-known such as, for example: the use of a deck on jacks, the deck resting on fixed columns at the top of the shaft, the top of the shaft being level with the surface of the water or slightly submerged. The loading is made at a small height above the level of the water whereupon the deck is raised and fixed at the desired height.

We claim:

1. An oscillatable installation installed at a fixed site in a body of water, comprising a shaft which rests on a heavy base itself resting on the bed and which at its upper part supports a platform or any other part of the installation intended to be located above the level of the water, the shaft being connected to the base by a ball-joint enabling it to oscillate in any direction under the action of swell, the shaft being ballasted near to its base such that the total weight of the assembly of this ballast, shaft, platform or other part of the installation and masses which it carries, is greater than the maximum lifting force exerted on the shaft by the strongest swells so that the ball-joint, through the intermediary of which the shaft bears upon the base, is permanently under compression.

2. An installation including a ball-joint according to claim 1, characterized in that the contact elements of the joint comprise non-machined cast metal fixed respectively to the end of the shaft and on the base coupled together, the shaft and the base being at least partially immersed and therefore subjected to relative oscillatory movements to effect a grinding-in of the surfaces, and means injecting a washing fluid for processing the ground off particles between the contacting surfaces.

3. The installation according to claim 2, comprising a ball-joint with metal to metal contact, characterized in that means for injecting an abrasive material followed by a washing fluid are provided at at least one point of the joint.

4. An installation according to claim 3, characterised in that the means of injecting lubricant are the same as those used for injecting the washing fluid.

5. An installation according to claim 1, characterised in that the shaft comprises an impervious part forming a float so disposed that its hydrostatic centre of pressure is located above the centre of gravity of the assembly of shaft, platform and masses that it carries to ensure the return of the shaft to the vertical position.

6. An installation according to claim 1, characterised in that the base consists of a hollow body having a central column, on the top of which is located the joint, and having as well radial partitions, the latter forming compartments, which can be supplied with liquid.

7. An installation according to claim 1, characterised in that the ball-joint comprises a deformable packing inserted between a convex surface formed on the lower part of the shaft and a concave surface formed on the base.

8. An installation installed at a fixed site in a body of water, comprising a shaft which rests on a heavy base itself resting on a bed and which at its upper part supports a platform or any other part of the installation intended to be located above the level of the water, the shaft being connected to the base by a ball-joint enabling it to oscillate in any direction under the action of swell, a deformable packing inserted between a convex surface formed on the lower part of the shaft and a concave surface formed on the base, the deformable packing comprising a pile of alternate layers of elastomer and sheet metal intercalated between two metal armatures, the different layers and armatures being glued together, the shaft being ballasted near to its base such that the total weight of the assembly of this ballast, shaft, platform or other part of the installation and masses which it carries, is greater than the maximum lifting force exerted on the shaft by the strongest swells so that the ball-joint, through the intermediary of which the shaft bears upon the base, is permanently under compression.

9. An installation according to claim 8, characterised in that the pile of elastomer and sheet metal, as well as the armatures, are formed of spherical elements and of polygonical shape, disposed between spherical caps integral respectively with the shaft and the base and to which the said elements are fixed.

10. An installation according to claim 8, characterised in that the different layers and armatures have the form of a spherical cap and are disposed between the metal spherical caps integral respectively with the shaft and the base and to which the armatures are fixed, in such manner that the various caps are substantially concentric.

11. An installation according to claim 8, characterised in that the pile of elastomer and sheet metal, as well as the armatures, are formed of flat elements and of polygonical shape, located between polyhedric caps integral respectively with the shaft and the base and to which the said elements are fixed.

12. An installation according to claim 7, characterised in that the deformable packing comprises an hydraulic cushion formed of a deformable envelope that can be supplied with liquid.

13. An installation according to claim 1, characterised in that the ball joint comprises a ball bearing intercalated between a convex spherical surface provided on the lower part of the shaft and a concave spherical surface provided on the base, the ball bearing having balls distributed between these two surfaces in a cage in the form of a spherical cap.

14. An installation according to claim 13, characterised in that the balls are of elastomer.

15. An installation installed at a fixed site in a body of water, comprising a shaft which rests on a heavy base itself resting on a bed and which at its upper part supports a platform or any other part of the installation intended to be located above the level of the water, the shaft being connected to the base by a ball-joint enabling it to oscillate in any direction under the action of swell, a deformable packing inserted between a convex surface formed on the lower part of the shaft and a concave surface formed on the base, the volume comprised between the lower part of the shaft carrying a joint member, the surface of the base carrying the second joint member, and a wall concentric with the said joint and surrounding the base of the shaft, is filled with bodies of revolution of small dimensions, the interstitial spaces being occupied by a viscous fluid, the shaft being ballasted near to its base such that the total weight of the assembly of this ballast, shaft, platform or other part of the installation and masses which it carries is greater than the maximum lifting force exerted on the shaft by the strongest swells so that the ball-joint, through the intermediary of which the shaft bears upon the base, is permanently under compression.

16. An installation according to claim 1, characterised in that the shaft and the base are provided with sets of teeth in the form of spherical caps which intermesh and roll on each other.

17. An installation installed at a fixed site on a body of water, comprising a shaft which rests on a heavy base itself resting on a bed and which at its upper part supports a platform or any other part of the installation intended to be located above the level of the water, the shaft being connected to the base by a ball-joint enabling it to oscillate in any direction under the action of swell, the shaft and the base being provided with sets of teeth in the form of spherical caps which intermesh and roll on each other, the shaft and the base further comprising an arrangement of projections and grooves preventing the shaft from turning about its vertical axis with respect to the base, the said grooves having a V-section, the point of the V connecting according to the major axis of an ellipse, the shaft being ballasted near to its base such that the total weight of the assembly of this ballast, shaft, platform or other part of the installation and masses which it carries, is greater than the maximum lifting force exerted on the shaft by the strongest swells so that the ball-joint, through the intermediary of which the shaft bears upon the base, is permanently under compression.

18. An installation installed at a fixed site on a body of water, comprising a shaft which rests on a heavy base itself resting on a bed and which at its upper part supports a platform or any other part of the installation intended to be located above the level of the water, the shaft being connected to the base by a ball-joint enabling it to oscillate in any direction under the action of swell, the shaft and the base being provided with sets of teeth in the form of spherical caps which intermesh and roll on each other, means are provided for injecting dense lubricant between the teeth, the shaft being ballasted near to its base such that the total weight of the assembly of this ballast, shaft, platform or other part of the installation and masses which it carries, is greater than the maximum lifting force exerted on the shaft by the strongest swells so that the ball-joint, through the intermediary of which the shaft bears upon the base, is permanently under compression.

19. An installation according to claim 1, characterised in that it comprises means for correcting listing consisting of regulating caissons disposed at various points of the installation, the correction being effected by the transfer of water without altering the total weight of the installation.

20. An installation according to claim 19, characterised in that the caissons are disposed at the upper part of the shaft and take the form of a cylindrical volume divided by radial partitions, occupying a part of the shaft.

21. An installation according to claim 1, characterised in that it comprises means for correcting listing consisting of regulating caissons provided with turbines piloted by a hydraulic positioning device.

22. An installation according to claim 1, characterised in that it comprises means of correcting listing consisting of propellers fixed to the shaft and piloted by a hydraulic positioning device.

23. An installation according to claim 1, characterised in that the base and the lower part of the shaft are assembled by their joint, and the base is provided with a buoyancy higher than its weight so that the joint is always in compression and is held submerged by the introduction of water into the base and the shaft in such manner that only a part of the shaft is emergent.

24. An installation installed at a fixed site in a body of water, comprising a shaft which rests on a heavy base itself resting on a bed and which at its upper part supports a platform or any other part of the installation intended to be located above the level of the water, the shaft being connected to the base by a ball-joint enabling it to oscillate in any direction under the action of swell, the shaft being ballasted near to its base such that the total weight of the assembly of this ballast, shaft, platform or other part of the installation and masses which it carries, is greater than the maximum lifting force exerted on the shaft by the strongest swells so that the ball-joint, through the intermediary of which the shaft bears upon the base, is permanently under compression, the base and shaft, assembled by the ball-joint and the platform, connected to the shaft by links float in a substantially horizontal position, the base and the shaft, at least, afloat, the base and the end of the shaft adjacent the base being ballasted, and means supplying ballast to move the shaft progressively into the vertical position, the base and the lower part of the shaft, assembled by their joint, being held submerged by the introduction of water into the base and the shaft in such manner that only part of the shaft is emergent.

25. An installation according to claim 24, characterized in that the platform floats separately from the base with linking means connecting the top of the shaft to an edge of the platform so that the top of the shaft, by means of linkage, causes the deck to swing into a position substantially perpendicular to the axis of the shaft so that the deck can be fixed to the top of the shaft when the base and shaft are ballasted to bring them into the vertical position.

26. An installation installed at a fixed site in a body of water, comprising a shaft which rests on a heavy base itself resting on a bed and which at its upper part supports a platform or any other part of the installation intended to be located above the level of the water, the shaft being connected to the base by a ball-joint enabling it to oscillate in any direction under the action of swell, the platform being connected to a barge by linkage means and fixed by a link hinged to the edge of the shaft, and jacks being placed in position between the platform and the shaft, the barge having ballast means and means dismantling device connecting the platform to the barge, so that when the base and the shaft are progressively righted the jacks keep the platform horizontal so that the deck can be fixed to the shaft and the jacks dismantled when the base and the shaft are in their final position, the shaft being ballasted near to its base such that the total weight of the assembly of this ballast, shaft, platform or other part of the installation and masses which it carries, is greater than the maximum lifting force exerted on the shaft by the strongest swells so that the ball-joint, through the intermediary of which the shaft bears upon the base, is permanently under compression, the base and the lower part of the shaft, assembled by their joint, being held submerged by the introduction of water into the base and the shaft in such manner that only a part of the shaft is emergent.

* * * * *